July 7, 1970  G. H. HEILMEIER  3,519,330
TURNOFF METHOD AND CIRCUIT FOR LIQUID CRYSTAL DISPLAY ELEMENT
Filed Sept. 14, 1967  3 Sheets-Sheet 1

INVENTOR
GEORGE H. HEILMEIER
BY
ATTORNEY

July 7, 1970  G. H. HEILMEIER  3,519,330
TURNOFF METHOD AND CIRCUIT FOR LIQUID CRYSTAL DISPLAY ELEMENT
Filed Sept. 14, 1967  3 Sheets-Sheet 2
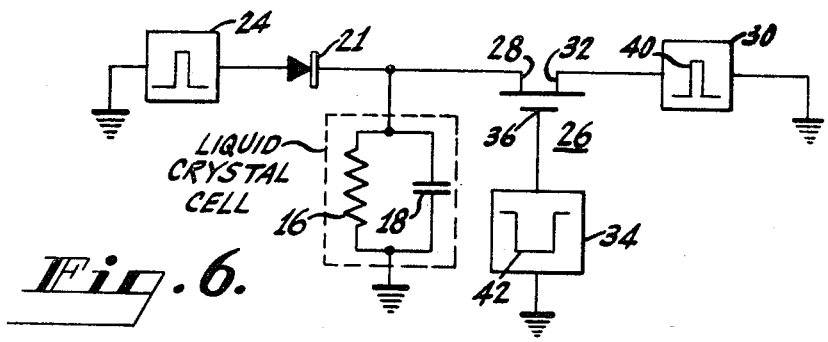
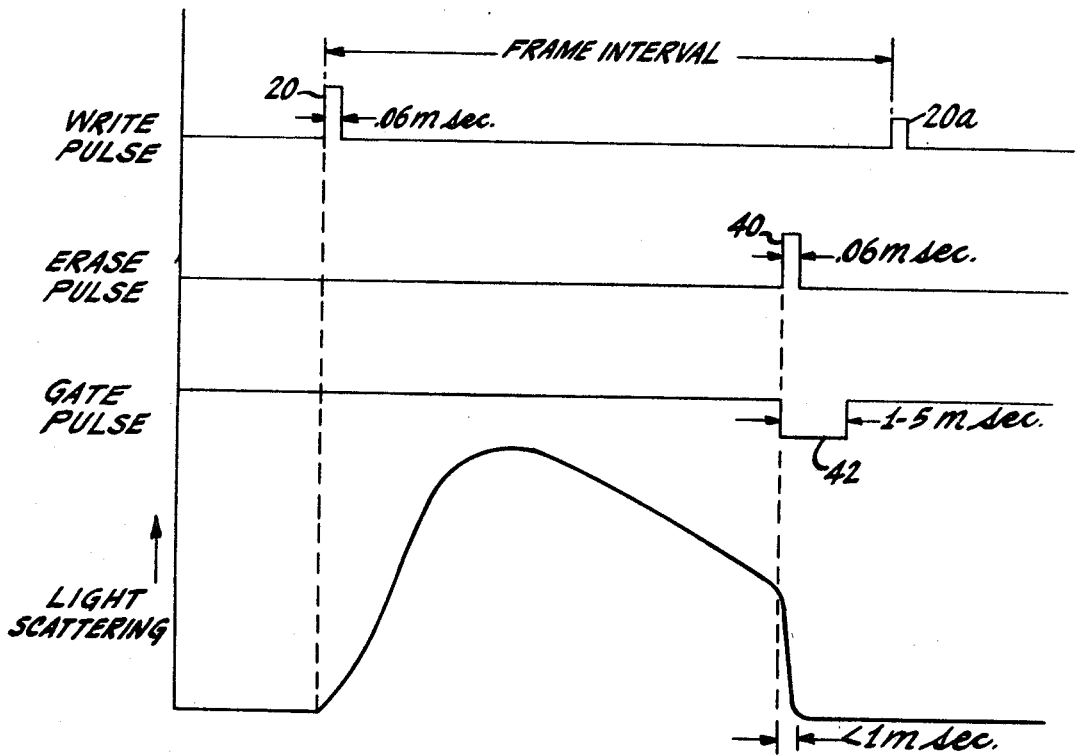
INVENTOR
GEORGE H. HEILMEIER
BY
ATTORNEY July 7, 1970            G. H. HEILMEIER          3,519,330
TURNOFF METHOD AND CIRCUIT FOR LIQUID CRYSTAL DISPLAY ELEMENT Filed Sept. 14, 1967                                    3 Sheets-Sheet 3

INVENTOR
GEORGE H. HEILMEIER
BY Samuel Cohen
ATTORNEY

United States Patent Office 3,519,330
Patented July 7, 1970

3,519,330
TURNOFF METHOD AND CIRCUIT FOR LIQUID CRYSTAL DISPLAY ELEMENT
George H. Heilmeier, Philadelphia, Pa., assignor to RCA Corporation, a corporation of Delaware
Filed Sept. 14, 1967, Ser. No. 667,858
Int. Cl. G02f 1/28
U.S. Cl. 350—160                    5 Claims

ABSTRACT OF THE DISCLOSURE

Liquid crystal element is turned off by applying a relatively short-duration, relatively high-amplitude voltage pulse thereto during a period in which the cell is not permitted to store charge.

BACKGROUND OF THE INVENTION

Nematic liquid crystals are described in copending application, Electro-Optical Device, Ser. No. 627,515, filed Mar. 31, 1967, by George H. Heilmeier and Louis A. Zanoni and assigned to the same assignee as the present application. Such crystals, when in an unexcited state, are relatively transparent to light and, when in an excited state, scatter light. In the crystals described in the application, the light scattering, termed "dynamic scattering," results from turbulence developed in the liquid crystal at the region at which it is excited as is discussed briefly later.

The dynamic scattering exhibited by liquid crystals may be employed in reflective, absorptive and transmission type flat panel displays, in light shutters and in other applications. However, the recovery time of the liquid crystal, after it is excited, may be relatively long—longer, for example, than the approximately 30 millisecond frame time of commercial television. This is a serious disadvantage in this particular application as, within a relatively few frame intervals, any element which receives repeated video excitation will light up at full intensity. This results in objectionable smear of moving objects.

The object of this invention is to provide a means for quickly erasing a liquid crystal display element, that is, for quickly returning such an element to its relatively transparent condition after it has been excited.

SUMMARY OF THE INVENTION

A nematic liquid crystal element is turned off according to the invention by quickly aligning the domains therein and doing this in such a manner that appreciable ion transit cannot occur through the element.

BRIEF DESCRIPTION OF THE DRAWING

FIG. 6 is a schematic drawing of a turnoff circuit according to the invention;

FIG. 7 is a drawing of waveforms and of the light scattering characteristic of the circuit of FIG. 6;

DETAILED DESCRIPTION

Figure 1:
FIG. 1 is a schematic showing of a liquid crystal in its unexcited state.

In a nematic liquid crystal of the type discussed in detail in the copending application, liquid crystal molecules are arranged in the manner shown in FIG. 1 in a temperature range of interest in the use of this substance in display applications. As contrasted to ordinary liquids wherein the molecules assume random orientations, small groups of the molecules are in alignment with one another. These groups may be termed domains. The orientations of the domains relative to one another is random and in view of the fact that the number of molecules in each domain is relatively small, the liquid crystal appears to be relatively transparent.

Figure 2:
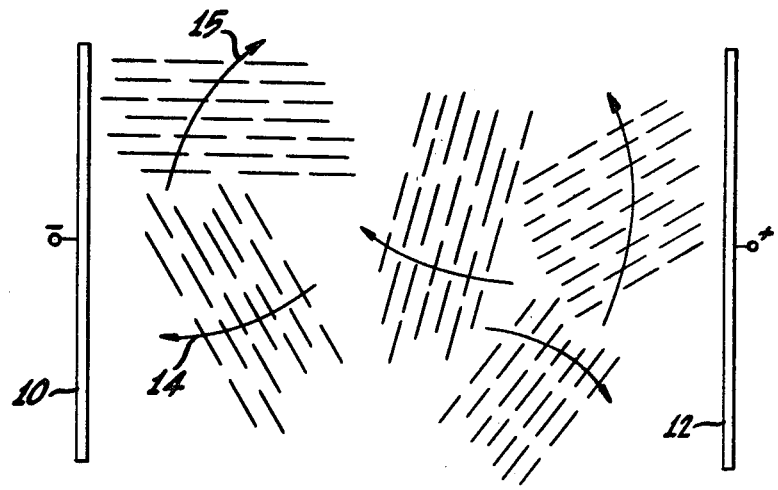
FIG. 2 is a schematic showing of a liquid crystal in its excited state.

In the use of a nematic liquid crystal in display and other applications, the crystal is located between two conducting elements, shown schematically at 10 and 12 in FIG. 2, and a current is injected into the liquid crystal at a field greater than the dynamic scattering threshold electric field of the crystal. This applied electric field causes a number of the domains of FIG. 1 to become aligned so that each domain becomes relatively large. While it may appear that the electric field also should align the relatively large domains with one another, it has been discovered that when the liquid crystal is operated in the manner discussed in the copending application, the domains exhibit turbulent motion, as indicated schematically by the arrows such as 14 and 15.

It is believed that ions injected at the electrodes (the conductors) or produced by other means, during the time they are traveling toward the conductor 12 (and/or 10), collide with or in some other way disturb the relatively large domains causing them continually to move. The effect on the eye of such movement is that of scattering light which is incident on the liquid crystal. Contrast ratios due to such scattering of more than 10 to 1 have been observed. In other words, the brightness of a thin film of liquid crystal in the presence of incident light (this normally is unpolarized light) may be more than 10 times greater during the time the domains are in a turbulent state as shown in FIG. 2 than during the time the liquid crystal is in an unexcited state as shown in FIG. 1.

In practice, a liquid crystal display includes two planar elements with a thin liquid film between them. One of the elements may be transparent and the other reflective. Row and column conductors, which may be transparent conductors, may be in contact with the liquid crystal for exciting selected areas of the liquid crystal. All of this is discussed and shown in the copending application.

For purposes of the present explanation, the equivalent circuit of the liquid crystal may be considered to be a resistor of relatively large value such as shown at 16 (FIG. 3) in shunt with a capacitor such as shown at 18. Actually, the equivalent circuit is more complex than this, as the resistor acts like a non-linear element which does not reach its maximum value until a number of pulses 20 have been applied. This characteristic and means for increasing the effective value of resistance prior to the application of the pulses 20 is discussed in the concurrently filed application, "Reduction of Turn-On delay in Liquid Crystal Cell," Ser. No. 667,857, filed by George H. Heilmeier and Louis A Zanoni, which is assigned to the same assignee as the present application. It is to be understood that the circuit of the copending application may be incorporated herein; however, since it is not directly pertinent to what is being claimed here, it will not be discussed further.

The liquid crystal cell is excited by applying a pulse such as 20 to the crystal. In television applications, this pulse may have a duration of 0.06 millisecond which is equivalent to one television line time. This implies that a line of information is written at a time. Operation in this way is preferred because it permits a greater length of time for the capacitor 18 of the liquid cell to charge. It is also important that the capacitor 18 retain its charge for a reasonable time interval to permit the dynamic scattering to take place. The function of the diode 21 is to permit such storage. It prevents discharge of the capacitor through the source (not shown) which produces pulse 20 so that the capacitor must discharge through the liquid crystal itself as represented by the resistor 16.

Figure 4:
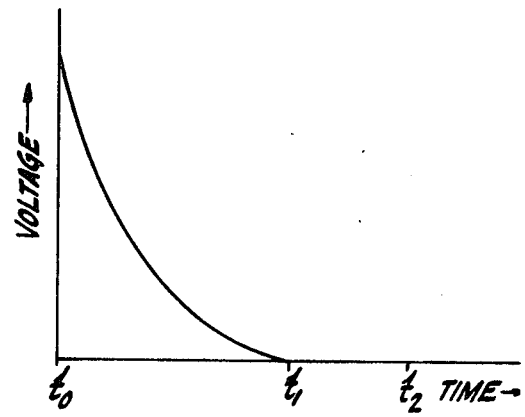
FIG. 4 is a drawing of the voltage which exists across the liquid crystal in the circuit of FIG. 3.

The actual voltage present across the liquid crystal cell is as shown in FIG. 4. At time $t_0$, the pulse 20 is applied. This charges the capacitor and the latter subsequently discharges exponentially, in the manner shown, until at time $t_1$ the capacitor has completely discharged. The time $t_0$ to $t_1$ is less than a commercial television frame interval which in FIG. 4 is illustrated to the time $t_0$ to $t_2$.

Figure 3:
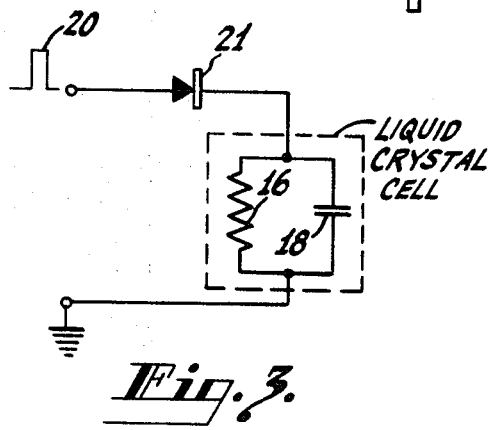
FIG. 3 is a schematic drawing of a liquid crystal excitation circuit in which the liquid crystal is shown in equivalent circuit form.
Figure 5:
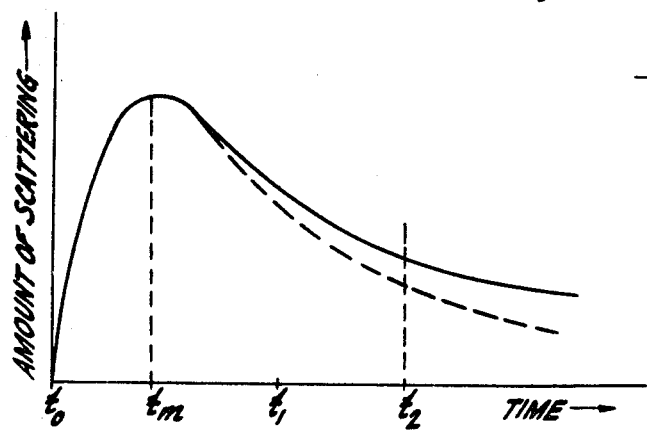
FIG. 5 is a graph showing the amount of light scattering which occurs in the liquid crystal of the circuit of FIG. 3.

The amount of light scattering which occurs in the liquid crystal cell of FIG. 3 is as shown in FIG. 5. It takes a short interval of time $t_0$ to $t_m$, approximately 1–10 milliseconds, (depending on the temperature, field strength and particular material used) for the maximum amount of light scattering to be achieved. At time $t_1$, when there is no longer any voltage across the liquid cell, there is still a considerable amount of scattering present, as the mechanical time constant, that is, the time it takes for the domains of FIG. 2 to relax from their excited condition to their unexcited condition shown in FIG. 1, is relatively long. As a matter of fact, even at time $t_2$, there is still a very substantial amount of light scattering which is produced. (The amount of relaxation which occurs in a given time depends upon such factors as the temperature, the thickness of liquid crystal layers, and so on, and this variability is indicated in FIG. 5 by the dashed curve.) The failure of the liquid crystal fully to relax by the time $t_2$ is, of course, a disadvantage since at this time new information must be applied to the cell. For example, it may be desired that the cell remain "dark" during a given frame interval and if the cell had been "lit up" at full amplitude during the previous frame, it would continue to glow after the new frame had begun.

A circuit according to the present invention for quickly turning off a liquid crystal cell is shown in FIG. 6. The excitation or "write" pulse source is shown at 24. The elements 16, 18 and 21 correspond to the like-numbered elements in the circuit of FIG. 3. In addition to these elements, the circuit of FIG. 6 includes a P-type insulated gate, field-effect transistor 26 connected at its drain electrode 28 to the liquid crystal cell. An erase pulse generator 30 is connected to the source electrode 32 of the transistor. A gate pulse generator 34 of low internal impedance is connected to the gate electrode 36 of the transistor.

The operation of the circuit of FIG. 6 may be better understood by referring also to FIG. 7. Information is written into the cell in the same manner as discussed previousy, by a pulse 20. A short interval (somewhat longer than the duration of gate pulse 42) before the following write pulse 20a occurs, an erase pulse 40 is applied to the soure electrode of the transistor 26 concurrently with the application of a gate pulse 42 to the gate electrode 36. The erase pulse may be of relatively short duration—the same 0.06 millisecond duration, for example, as the write pulse, but should be of relatively high amplitude, greater than that of the domain alignment voltage threshold of the cell. The actual value of voltage which should be employed depends upon many parameters including the amount of quenching which is desired, the thickness of the cell, the temperature, and so on. As one example, for some cells approximately ½ mil (0.005 inch) thick, erase voltages form 75 to 150 volts of 0.06 millisecond duration have been employed.

Figure 8:
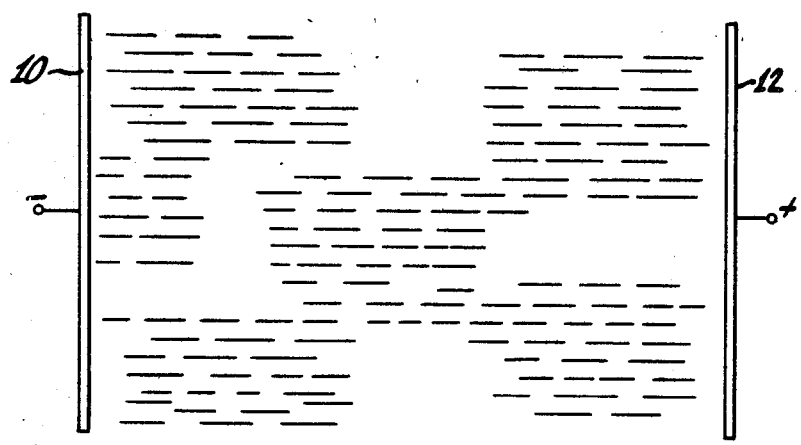
FIG. 8 is a drawing showing what occurs to the domains of the liquid crystal in response to the turnoff voltage applied thereto.

The gate pulse 42 should be of somewhat greater duration than the erase pulse. For example, if the erase pulse is of 0.06 millisecond duration, the gate pulse may have a duration of from 1 to 5 milliseconds. The gate pulse causes the impedance of the conduction path from the source-to-drain electrode of the transistor abruptly to change from a very high value of impedance to an extremely low value of impedance. The pulse 40 applied through the transistor to the liquid crystal cell causes a relatively high electric field to be produced across the cell. This causes the relatively large domains illustrated in FIG. 2 to align with the field in the manner shown in FIG. 8.

However, the pulse is of such short duration that there is insufficient time for ion current to flow through, that is, for ions to move a significant distance through the liquid crystal during the pulse interval.

After the erase pulse has terminated, the gate pulse is still present so that there is a low impedance path from the capacitor 18 of the liquid crystal cell through the low impedance of the conduction path of the transistor 26 and the low internal impedance of the erase pulse generator 30 to ground. Accordingly, any charge which momentarily accumulates on the capacitor 18 quickly discharges to ground. The time required for this discharge to occur is sufficiently short that ion transit induced turbulence is not created.

The light scattering characteristic obtained with the circuit of FIG. 6 is as illustrated in the last graph of the FIG. 7. The amount of light scattering produced drops off to an extremely low value within a period of less than a millisecond. During this period, the amount of light scattering does not drop to zero such as would be the case if the domains were completely unexcited as shown in FIG. 1 but does drop to a very small value. The contrast ratio is typically between 1 and 1½.

Figure 9:
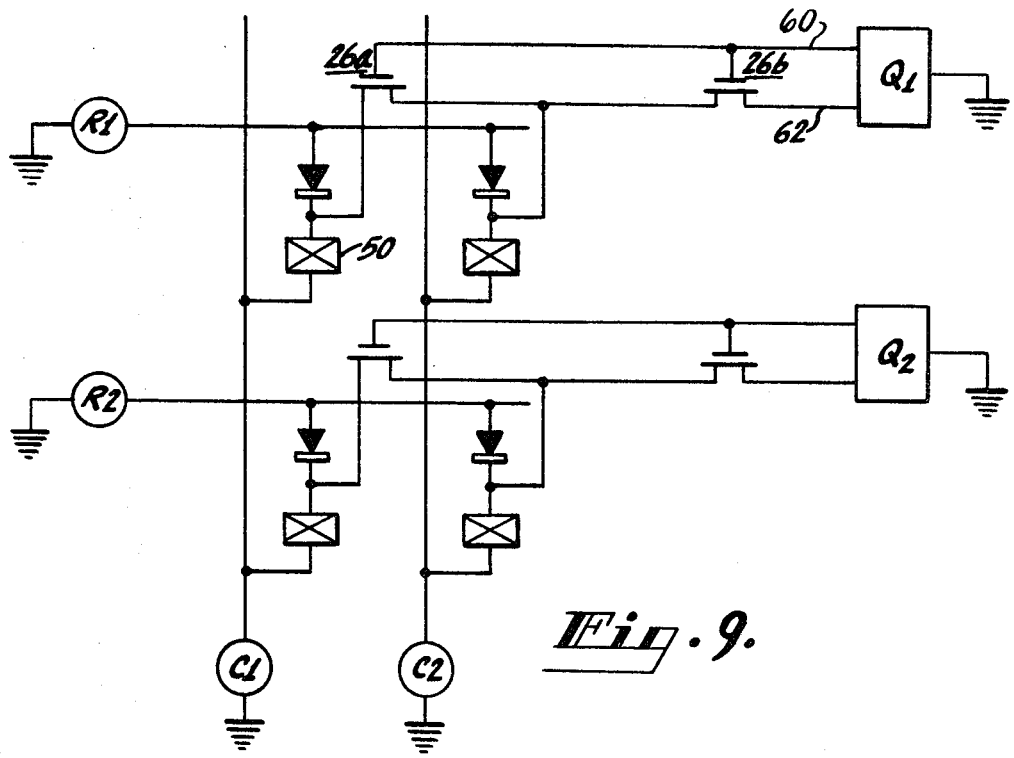
FIG. 9 is a schematic showing of a two-by-two matrix of display elements which employs the circuit of FIG. 6.

The liquid crystal cells of FIG. 6 may be arranged in a matrix in a manner shown in FIG. 9. While only a two-by-two matrix is illustrated, in practice there would be many more elements than this. Each liquid crystal element such as 50, 51 and so on is connected to one row and one column conductor. To turn on a liquid crystal element such as 50, a positive pulse is applied by the row generator R1 concurrently with the application of a negative pulse by the column generator C1. The two pulses together are of sufficient amplitude to produce a voltage across the liquid crystal which is greater than the threshold of the crystal whereas a single pulse is of insufficient amplitude to do this. The liquid crystal element 50 may be turned off by applying a negative gate pulse to lead 60 and a positive erase pulse to lead 62 with the erase pulse generator Q1. Note that there need be only one erase pulse generator per row.

As already mentioned, in television applications of the circuit of FIG. 9, one row of information may be applied to a display at a time. This means, for example, that during the time a row pulse from source R1 is applied, information present in, for example, a register (corresponding to C1, C2) is concurrently applied to all of the elements in row 1 of the matrix of FIG. 1.

While the erase circuit of the invention has been illustrated as including only a single transistor of a particular type, it is to be understood that this is merely illustrative. Other circuits are possible. For example, the circuit may include two switches, one placed in shunt with the liquid crystal cell and the other placed in series between the erase pulse source 30 and the liquid crystal cell. In a circuit of this type, the erase pulse switch may be closed and erase pulse applied therethrough to the liquid crystal and then opened, and concurrently with the opening of this switch, the shunt-connected switch may be closed to provide a low impedance discharge path for the liquid crystal cell. In practice, of course, these switches may be transistors of the field-effect, junction or other type. Alternatively, in applications in which only slow scanning is needed, the switches may indeed be mechanical switches.

What is claimed is:

1. A method for reducing the time required, after the exciting electric field has been removed, for a nematic liquid crystal which has been placed in the light scattering condition to return to its non-light scattering condition comprising the step of applying a short duration intense electric field to the crystal while preventing the crystal from storing a charge due to said field.

2. A method for reducing the time for a nematic liquid crystal which has been placed in the light scattering state by the application thereto of an electric field of greater than a given threshold value, to return to its original condition after the exciting electric field has been removed comprising the steps of:
  applying an electric field to the crystal of a magnitude greater than said threshold value but of duration shorter than that which is required to cause the flow of ion current through the crystal; and
  providing a low impedance discharge path for any charge which may tend to accumulate in the liquid crystal due to the application of said electric field.

3. The combination of:
  a nematic liquid crystal of the type which may be placed in its light scattering state by the application thereto of an electric field of greater than a given threshold value and which returns to its original condition after the exciting electric field has been removed; and
  a circuit for reducing the time required for said nematic liquid crystal to return to its original condition after the exciting electric field has been removed, comprising;
    a pulse source for applying to said liquid crystal a voltage pulse of an amplitude sufficient to produce an electric field across said crystal which exceeds said threshold value but of a duration insufficient to cause the flow of current through the crystal; and
    means coupled to the crystal providing a low impedance discharge path for the charge which tends to accumulate in the crystal as a result of the application of said voltage pulse.

4. A circuit as set forth in claim 3 wherein said last-named means comprises a field-effect transistor and means for applying a gate pulse to said transistor for placing the conduction channel of said transistor in a low impedance condition.

5. A circuit as set forth in claim 4 wherein said pulse source is connected to said field-effect transistor and applies its pulse to said liquid crystal through the conduction channel of said transistor.

References Cited

UNITED STATES PATENTS

| | | | |
|---|---|---|---|
| 2,543,793 | 3/1951 | Marks | 178—6.5 |
| 3,257,903 | 6/1966 | Marks. | |
| 3,341,274 | 9/1967 | Marks. | |
| 3,364,433 | 1/1968 | Freund et al. | |

RONALD L. WIBERT, Primary Examiner

P. K. GODWIN, Jr., Assistant Examiner

U.S. Cl. X.R.

307—298